United States Patent
Steinbrenner et al.

[11] Patent Number: 5,317,910
[45] Date of Patent: Jun. 7, 1994

[54] PROCESS FOR DETERMINING A FLOW RATE OF A FLUID

[75] Inventors: Ulrich Steinbrenner, Stuttgart; Willi Rosenau, Tamm; Wolfgang Wagner, Konrtal-Münchingen; Jürgen Neubert, Stuttgart; Helmut Pflieger, Heilbronn, all of Fed. Rep. of Germany

[73] Assignee: Robert Bosch GmbH, Stuttgart, Fed. Rep. of Germany

[21] Appl. No.: 965,300
[22] PCT Filed: Sep. 18, 1991
[86] PCT No.: PCT/DE91/00740
  § 371 Date: Jan. 29, 1993
  § 102(e) Date: Jan. 29, 1993
[87] PCT Pub. No.: WO92/07237
  PCT Pub. Date: Apr. 30, 1992

[30] Foreign Application Priority Data
Oct. 12, 1990 [DE] Fed. Rep. of Germany ....... 4032422
Dec. 28, 1990 [DE] Fed. Rep. of Germany ....... 4042150

[51] Int. Cl.$^5$ ................ G01M 19/00; G01P 5/00
[52] U.S. Cl. ................ 73/118.2; 73/204.18
[58] Field of Search ........... 73/118.2, 204.18, 204.19, 73/204.27

[56] References Cited
U.S. PATENT DOCUMENTS
4,934,188  6/1990  Tanimoto et al. ............ 73/118.2
4,934,189  6/1990  Tanimoto et al. ............ 73/204.18
4,966,033 10/1990  Nishimura et al. .......... 73/118.2

Primary Examiner—Richard E. Chilcot, Jr.
Assistant Examiner—William L. Oen
Attorney, Agent, or Firm—Kenyon & Kenyon

[57] ABSTRACT

A process for determining the flow rate of a fluid, in particular of an air flow of an internal combustion engine, a temperature dependent resistor through which a heating current flows being arranged in the flow path of the fluid, the size of the heating current being a measure of the flow rate of the fluid, the temperature of the resistor being determined by a temperature sensor and being set to a constant value by means of a circuit arrangement which influences the heating current, and the fluid flow rate determined immediately after the start of the fluid flow being corrected by means of a correction value (k, k') in order to compensate for a measurement error which occurs when the heating current is switched on but when fluid is not yet flowing due to temperature deviation of the resistor.

15 Claims, 3 Drawing Sheets

PROCESS FOR DETERMINING A FLOW RATE OF A FLUID

FIELD OF THE INVENTION

The present invention relates to a process for determining the flow rate of a fluid, in particular of an air flow of an internal combustion engine; a temperature-dependent resistor through which a heating current flows being arranged in the flow path of the fluid, the size of the heating current being a measure of the flow rate of the fluid, and the temperature of the resistor being determined by a temperature sensor and being set to a constant value by means of a circuit arrangement which influences the heating current.

BACKGROUND OF THE INVENTION

A process of this kind is disclosed in German No. DE-A1-3 433 368, in which the air flow fed to the internal combustion engine is determined, the determined value being fed to a control device for influencing the operating parameters of the internal combustion engine. It is known to use a so-called hot-wire or hot-film air flow rate meter for this. In the case of the hot-wire air flow rate meter, the intake air flow is directed past a heated wire (hot wire). This wire is part of an electrical bridge circuit. It constitutes the temperature-dependent resistor already mentioned, through which a heating current flows. The hot wire is held at a constant higher temperature than the intake air temperature by the heating current. The required heating current is a measure of the air flow sucked in by the engine. It is converted into a voltage signal which is processed by the control unit as an important input variable in addition to the engine speed. A temperature sensor, i.e., the temperature sensor already mentioned, installed in the hot-wire air flow meter ensures that the output signal is not dependent on the intake air temperature. In addition, it serves to keep the resistor through which the heating current flows at the constant higher temperature. A hot-film air flow rate meter is of a corresponding design. Instead of the hot wire, a film-like resistor is used.

U.S. Pat. No. 4,658,641 discloses a process for determining the flow rate of a fluid which is used to determine the air flow rate in an internal combustion engine. In order to prevent the temperature-dependent resistor heating up too strongly when the air flow is switched off (when the internal conmbustion engine is stationary), the heating current is switched off as soon as the air flow rate undershoots a predetermined threshold value.

European No. EP-A300 144 027 discloses a device for measuring the sucked-in air flow in an internal combustion engine which has a bridge circuit. The bridge circuit comprises a heatable resistor in the intake path of the internal combustion engine, a resistor for measuring the temperature of the sucked-in air and further bridge resistors. A heating current is fed to the bridge circuit via a transistor which is periodically driven by a signal which is generated by a microcomputer. A signal which represents the temperature change of the resistor which can be heated up by a heating current is detected by the microcomputer. A first correction signal is determined from the difference between a value detected by the microcomputer and a signal which takes into account the temperature of the heatable resistor at normal temperature and in the case of equilibrium of the bridges. A correction value which influences the duration of the control signal is determined as a function of the first correction signal with the aid of a table. This second correction signal is used for the correction of the duration of the passage of current.

German No. DE-A1-4 004 552 also discloses a signal processing method for a flow rate sensor of the thermal type which has a resistor with temperature dependency. When the fluid flow is in the steady state, that is, in the so-called state of equilibrium, the following steps in this signal processing method are carried out: setting in advance the relation of a value assigned to the flow rate, which value changes in accordance with the change in the flow rate, and in accordance with a first operating value which indicates the temperature characteristic of the carrier component bearing the temperature-dependent resistor, which value or which characteristic changes as a function in order to produce a value, as parameter, assigned to the flow rate; calculation of the first operating parameter from a value assigned to the flow rate when the flow rate is detected in accordance with the predetermined relation; comparison of the calculated first operating value with the second operating value which is set in relation to the first operating value; correction of the second operating value so that it can be approximated to the first operating calculation of a compensation factor by means of a predetermined calculation formula with the calculated first operating value and the correct second operating value; and compensation of the compensation factor by means of multiplication.

SUMMARY OF THE INVENTION

In contrast, the process according to the present invention has the advantage that a particularly high measuring accuracy is achieved since errors which occur due to the inertia during the heat transmission, e.g. on the measuring substrate and from the temperature-dependent resistor to the temperature sensor, are eliminated. For this purpose, in order to compensate for a measurement error which occurs when the heating current is switched on but when fluid is not yet flowing due to excessive temperature increase of the resistor, the fluid flow rate determined immediately after the start of the fluid flow is corrected by means of a correction value. If, for example, a hot-wire air flow rate meter or a hot-film air flow rate meter of an internal combustion engine is considered, before the internal combustion engine starts, the voltage supply to the air flow rate meter is switched on by switching on the ignition. This switching-on of the operating-voltage leads to an undesired temperature distribution in the air flow rate meter which results in measuring errors. When the fluid is not flowing, that is, when the air flow is switched off, the temperature dependent resistor and, thus, a sensor plate area connected thereto reaches a higher temperature in comparison with the temperature of the sensor plate in the case of an air flow being present. The temperature sensor already mentioned is also arranged on the sensor plate, a heat transmission resistor also existing between the temperature-dependent resistor and the temperature sensor so that temperature compensation can occur only after a specific time constant. Overall, this results in an excessively small air flow rate being measured at the start of the flow at the air flow rate meter when the internal combustion engine starts, due to the temperature compensation which occurs only then. This measurement error is eliminated according to the present invention by the obtained measurement value being corrupted with the correction value.

Preferably, there is provision for a correction factor to be used as a correction value, and for the measured fluid flow rate to be multiplied by this correction factor in order to obtain a corrected fluid flow rate.

Since the measurement error occurs only when a specific time passes between the hot-wire air flow rate meter being activated, that is to say the heating current being switched on, and the internal combustion engine being activated, there is preferably provision that the correction always occurs only whenever a predetermined minimum time has passed after the heating current is switched on.

In addition, the measurement error which occurs is dependent on the time which passes between the switching on of the ignition, that is to say the switching on of the heating current, and the starting of the internal combustion engine. Here, it is to be assumed that in every case the minimum time has passed. The magnitude of the correction value is increased—until a maximum time period has passed—under the conditions specified above as a function of the heating resistor operating time which has passed without a flow of fluid.

In particular, there is provision for an evaluated correction value to be used for operating times of the heating resistor which are present without a flow of fluid and which are smaller than a heating-up time which characterizes the completed temperature compensation between resistor (heating resistor) and temperature sensor. In addition, it is advantageous for heating resistor operating times occurring without a flow of fluid to obtain the correction value, as a function of the ambient temperature, in particular of the temperature of the internal combustion engine, from a characteristic line or a stored family of characteristic data lines, the value for the characteristic line or family of characteristic data lines forming the correction value for operating times which are greater than or equal to the heating-up time, and the evaluated correction value applying for operating times which are smaller than the heating-up time. In order to determine the evaluated correction value, the assigned correction value (initial correction value) is changed as a function of time. This occurs, in particular, incrementally, that is to say, it is a step function. However, alternatively, it is also possible for the correction value or the evaluated correction value to be notched down linearly. In addition, it is also conceivable to connect the correction value or the evaluated correction value for notching-down via a low-pass filter, in particular a low-pass filter of the first order.

As soon as stationary states are present during ongoing operation, a correction of the measurement value must be dispensed with. This occurs preferably in that the correction value or the evaluated correction value is notched down after the start of the fluid flow rate measurement by means of a selectable notching-down time constant. The notching-down time constant is dependent on the size of the evaluated correction value at the start of the notching-down. Further, during ongoing operation, the size of the fluid flow rate influences the notching-down time constant with which the correction factor is controlled. Omission from consideration preferably does not take place suddenly, but there is provision in particular for notching-down of the correction value or of the evaluated correction value to take place by means of incremental or continuous reduction.

DETAILED DESCRIPTION

Figure 1:
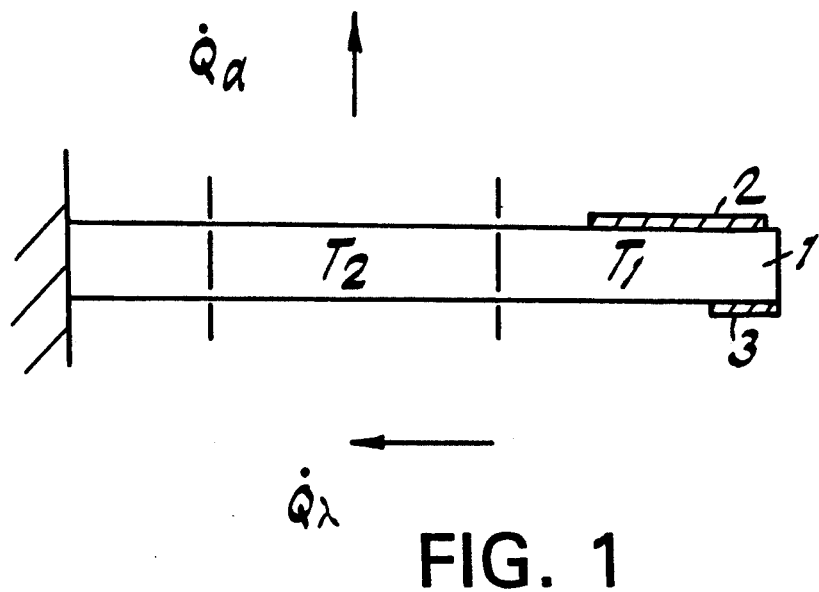
FIG. 1 shows a diagrammatic representation of the structure of a hot-film air flow rate meter.

FIG. 1 shows a sensor plate 1 of a hot-film air flow meter. A temperature-dependent resistor 2 through which a heating current flows is arranged on the sensor plate 1. The resistor 2 is located on one side of the sensor plate 1. On the other side of the sensor plate 1 there is a temperature sensor 3. The sensor plate 1 is arranged in the flow path of a fluid. In the present exemplary embodiment, this is the intake manifold of an internal combustion engine. Thus, the air flow fed to the internal combustion engine can be determined per unit time using the hot-film air flow rate meter. The temperature distribution of the sensor plate 1 changes at the start of the flow after heating up with the air flow in a static state. The heating up, that is to say the warming up of the resistor 2 by the heating current, takes place already after the switching on of the ignition whilst the air flow begins only at a later time, namely after the internal combustion engine is started. The heat transmission $Q_\alpha$ occurs transversely with respect to the sensor plate 2. The heat transmission $Q_\lambda$ takes place in the direction of the sensor plate 1. It is to be assumed that the temperature $T_1$ and—at an interval therefrom—the temperature $T_2$ are present in the region of the resistor 2 or of the temperature sensor 3.

During stationary operation with static air, the heat transmission $Q_\alpha$ is relatively small. This also applies to the heat transmission $Q_\lambda$. Therefore, the temperature $T_2$ is proportional to the temperature $T_1$. With the air flowing, the heat transmission $Q_\alpha$ is relatively large in the stationary state; this also applies to the heat transmission $Q_\lambda$. As a result, during operation with static air, a higher temperature $T_2$ occurs than in the case of operation with flowing air. If the time of the start of the flow, that is to say the time after the starting of the internal combustion engine, is considered, the temperature T2 is reduced, as a result of which the heating power is smaller than during the operation occurring previously. This leads to a measurement error which can be approximately −20% at most. After a specific time (approximately 15 seconds), this error is, however, compensated for again. However, it can be concluded overall that this measurement error cannot lead to an optimum operation control of the internal combustion engine. According to the present invention, there is therefore provision for the measurement error be compensated. For this, the following procedure is adopted:

A value a is obtained as a function of the temperature $T_{max}$ of the internal combustion engine in the course of an automatically occurring error correction of a characteristic line. This value a is a variable for the maximum required correction of the measurement value of the hot-film air flow rate meter after a correspondingly long heating-up time of the heating resistor without an air flow being present.

Figure 2:
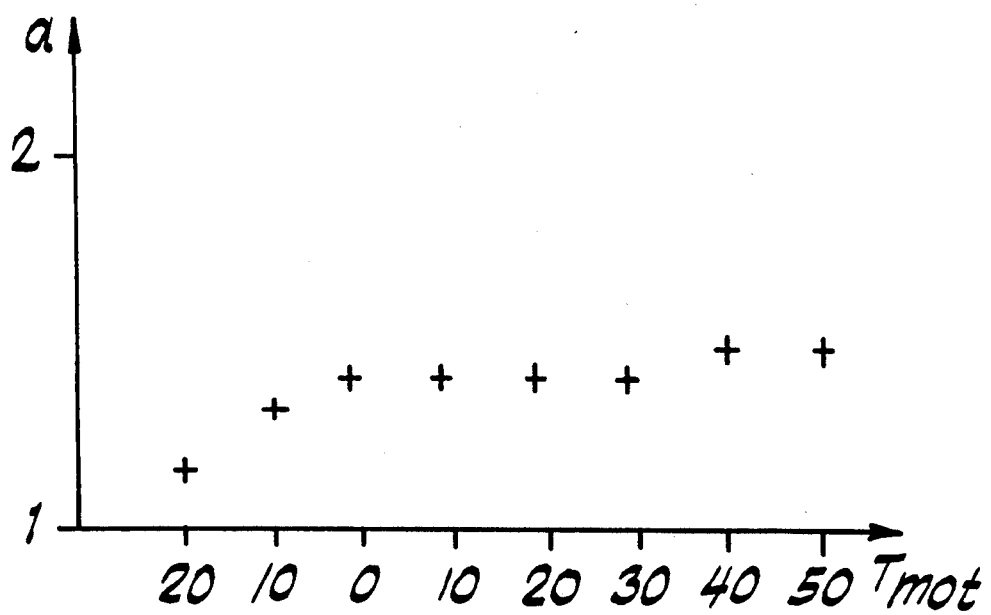
FIG. 2 shows a characteristic line.

Initially, the fundamental observation can be made that a measurement value correction occurs only whenever a minimum time $t_{min}$ has passed since the switching on of the ignition and the starting of the internal combustion engine. The minimum time $t_{min}$ can, however, also assume the value "0". If a maximum time has passed during which the operating time of the heating resistor is greater than its heating-up time $T_A$, the value a from the characteristic line in FIG. 2 is used as correction value k. The following relation then applies:

$$m_{corr} = k * m_{measured},$$

where $m_{corr}$ is the corrected air flow rate and $m_{measured}$ is the measured air flow rate.

Correction values k' evaluated as correction values are used for all times which are longer than the minimum time $t_{min}$ but shorter than or equal to the maximum time (heating-up time $t_A$). Here, it is assumed that the heating-up time $t_A$ of the sensor plate 1 results in a linear compensation process of the temperature distribution and/or one influenced by a low-pass filter, said process being terminated after the heating-up time $t_A$ has ended. When a second correction function is used, the low-pass filter behavior can be taken into account during the notching-up/notching-down. The notching-down time constant can be dependent on the size of the flow rate of the fluid. In addition, it is also alternatively or additionally possible for the notching-down time constant to be dependent on the size, that is to say the initial size, of the correction value or evaluated correction value. In order to calculate the current evaluated correction value k' which is to be set for the correction, the following equation applies:

$$k'(i) = k(i-1) + 1/256$$

where a time interval $i = b * 20.48$ ms is used. Here, b is the initial value of a timer with a quantization of 20.48 ms. The initial value b is calculated according to the relation $$b = \frac{t_A}{a(T_{eng})}$$

Figure 3:
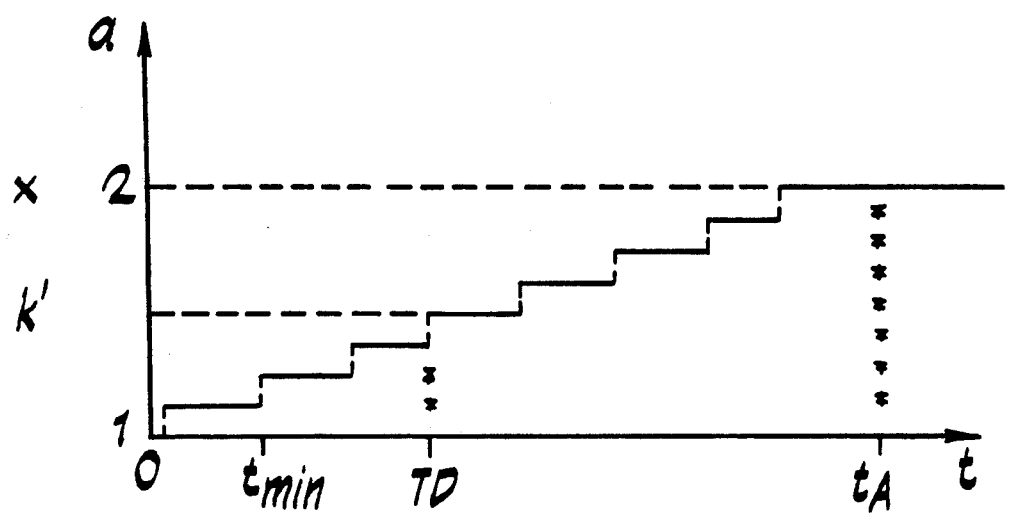
FIG. 3 shows the variation of a specific correction value as a function of the operating time of a heating resistor of the hot-film air flow rate meter.

The above points are illustrated in FIG. 3. In this figure, x illustrates a correction value (k) which applies for a specific temperature of the internal combustion engine (the value x therefore results from the characteristic line in FIG. 2). The heating-up time $t_A$ is entered on the time axis t of the diagram in FIG. 3. At the time $t_A$, the heating-up time has elapsed; here therefore the value x applies, that is to say the maximum correction value k for this operating point. For times between the minimum time $t_{min}$ and the heating-up time $t_A$, a correction value which is instantaneously valid, namely the evaluated correction value k', is used. This results from the stepped variation in the characteristic line in FIG. 3. Depending on the time of the starting of the engine, a correspondingly associated, evaluated correction value k' is obtained—in accordance with the step function. The correction value k' which is used is that which is present at the time when the internal combustion engine starts, that is to say at the time at which the air flow begins. This is characterized in FIG. 3 by TD.

If the measuring operation has begun, that is to say the internal combustion engine is in operation so that there is a flow of air, a steady state is established for the temperature distribution so that the correction value can no longer be taken into account. For this purpose, said value is preferably reduced incrementally until it assumes the value "1". Notching-down therefore occurs. This is provided preferably according to the relation:

$$k'(i) = k(i-1) - 1/256$$

In this case, the initial value of the time counter i has the quantization 20.48 ms and is calculated according to the relation:

$$b = \frac{t_{St}}{k' \text{ (or } k\text{)}}$$

Here, $t_{St}$ signifies a selectable time within which the notching-down as far as the value "1" is to be performed.

Figure 4:
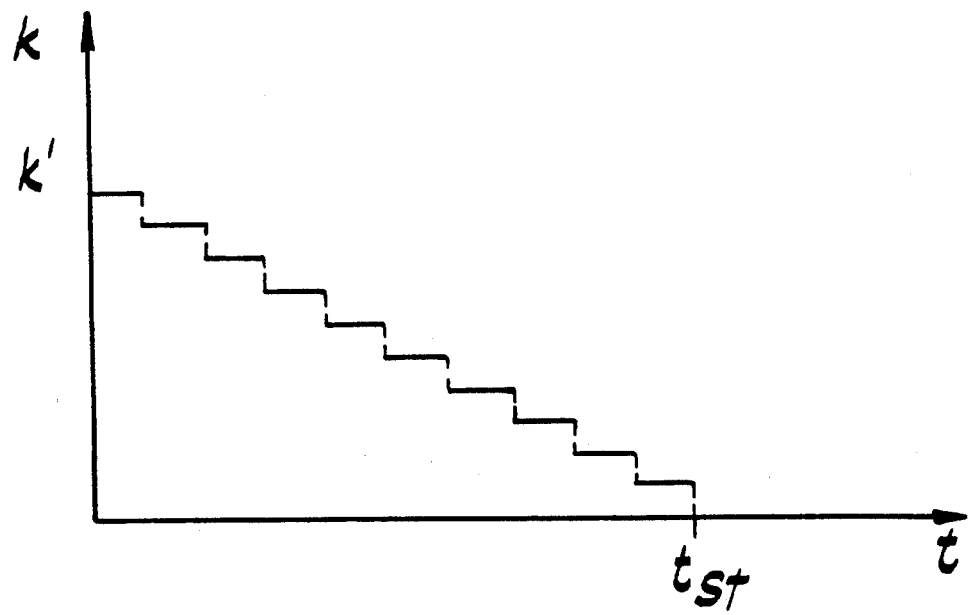
FIG. 4 shows a diagram which shows the stepped notching-down of the correction value after the start of the fluid flow rate measurement.

It can be seen from FIG. 4 that the instantaneously valid evaluated correction value k' is to be notched down incrementally within the notching-down time $t_{St}$ by identical amounts as far as the value "1".

Figure 5:
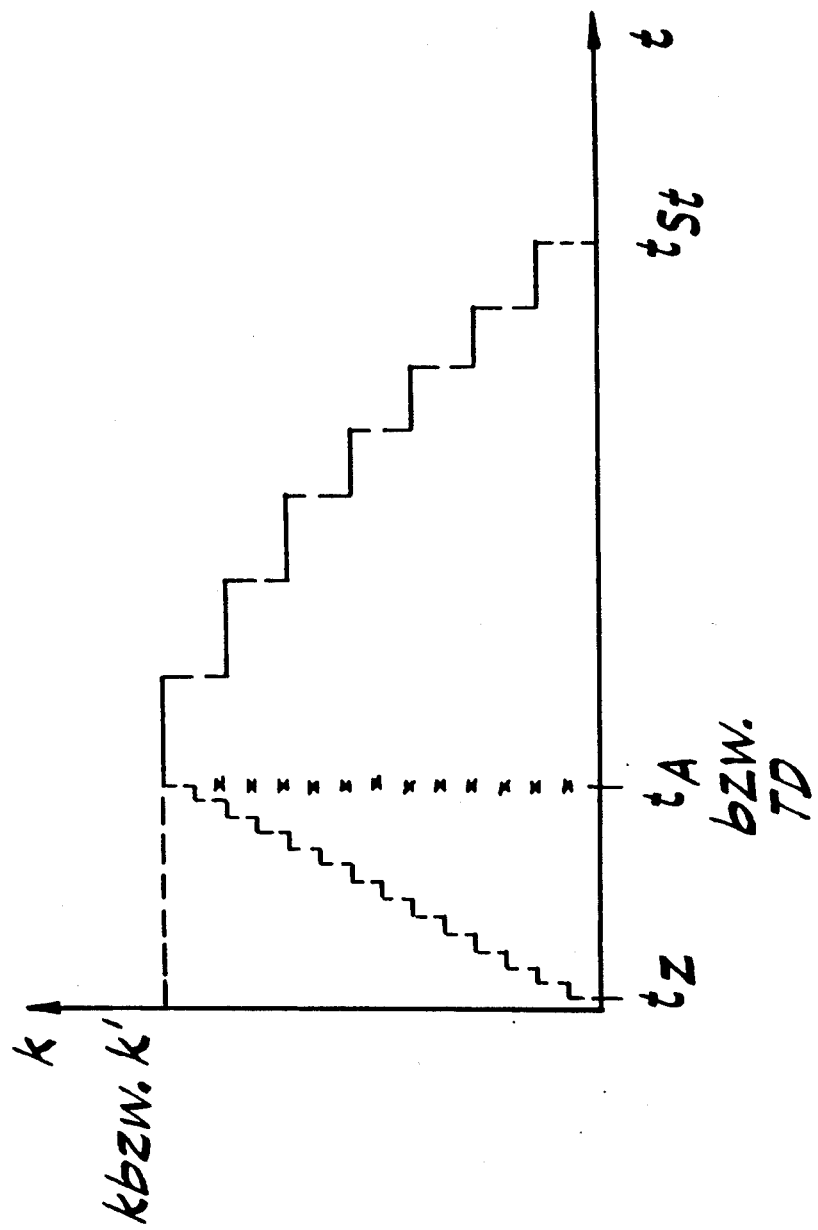
FIG. 5 shows an overall characteristic line which is made up of the characteristic lines in FIGS. 3 and 4.

The entire characteristic line of FIGS. 3 and 4 is illustrated once more in FIG. 5. At the time $t_z$, the ignition is switched on. From here, the rise, as far as the size of the correction value k or evaluated correction value k' corresponding to the operating state, takes place incrementally. At the time $t_A$ the maximum correction value is reached, provided the heating-up time has not yet elapsed, the time TD is present here, that is to say that the air flow begins here. Subsequently, an incremental notching-down of the correction value k or evaluated correction value k' then occurs. At the time $t_{St}$ this notching-down is then terminated.

What is claimed is:

1. A method of determining a flow rate of a fluid flowing over a temperature-dependent resistor through which a heating current flows, comprising the steps of:
    measuring the heating current;
    determining the flow rate of the fluid immediately after the fluid has started flowing as a function of the measured heating current;
    calculating a flow rate correction value based on an amount of time between the switching on of the heating current and the start of fluid flow over the temperature-dependent resistor; and
    correcting the determined flow rate as a function of the correction value to compensate for a measuring error when the heating current is switched on before the fluid has started flowing.

2. The method according to claim 1, further comprising the steps of:
    detecting a temperature of the resistor; and
    adjusting the heating current to set the temperature of the resistor to a constant value.

3. The method according to claim 1, wherein the determined flow rate is corrected by multiplying the determined flow rate by the correction value to obtain a corrected flow rate of the fluid.

4. The method according to claim 1, wherein the determined flow rate is equal to the corrected flow rate when the amount of time between the switching on of the heating current and the start of fluid flow over the temperature-dependent resistor is less than a preselected time.

5. The method according to claim 1, further comprising the step of correcting the determined flow rate as a function of the correction value when the amount of time between the switching on of the heating current and the start of fluid flow over the temperature-dependent resistor is less than a heating-up tie.

6. The method according to claim 5, wherein the correction value and the evaluated correction value are a function of an ambient temperature obtained from a characteristic line.

7. The method according to claim 6, wherein the determined flow rate is corrected as a function of the correction value when the operating amount of time is at least as great as the heating-up time.

8. The method according to claim 7, further comprising the step of modifying the correction value as a function of time to obtain the evaluated correction value.

9. The method according to claim 7, further comprising the step of decreasing at least one of the correction value and the evaluated correction value as a function of time.

10. The method according to claim 9, wherein the decrease is incremental.

11. The method according to claim 9, wherein the decrease is linear.

12. The method according to claim 9, wherein the decreasing step is performed by a low-pass filter.

13. The method according to claim 9, wherein the determined flow rate is corrected and the decreasing is performed for a preselected notching-down time.

14. The method according to claim 13, wherein the notching-down time is dependent on the correction value.

15. The method according to claim 13, wherein the notching-down time is dependent on the flow rate of the fluid.

* * * * *

UNITED STATES PATENT AND TRADEMARK OFFICE
CERTIFICATE OF CORRECTION

PATENT NO. : 5,317,910
DATED : June 7, 1994
INVENTOR(S) : Steinbrenner, et al.

It is certified that error appears in the above-indentified patent and that said Letters Patent is hereby corrected as shown below:

In column 1, line 52, change "EP-A300" to -- EP-A3-0 --;

Column 2, line 25, change "operating calculation" to -- operating value in accordance with the result of the comparison; calculation --;

Column 2, line 28, change "correct" to -- corrected --;

Column 4, line 61, change "error be" to -- error to be --;

Column 4, line 64, change "Tmax" to --$T_{mot}$--.

Column 7, line 6, change "tie" to -- time --.

Signed and Sealed this

Second Day of May, 1995

Attest:

BRUCE LEHMAN

Attesting Officer

Commissioner of Patents and Trademarks